(12) United States Patent
Brauning et al.

(10) Patent No.: US 11,984,572 B2
(45) Date of Patent: May 14, 2024

(54) BATTERY COOLING SYSTEM

(71) Applicant: Modine Manufacturing Company, Racine, WI (US)

(72) Inventors: Thomas Brauning, Stuttgart (DE); Andreas Girrleit, Stuttgart (DE); Jorg Speckmann, Hochdorf (DE); Niko Neub, Korntal (DE); Manuel Schon, Gaggenau (DE)

(73) Assignee: Modine Manufacturing Company, Racine, WI (US)

( * ) Notice: Subject to any disclaimer, the term of this patent is extended or adjusted under 35 U.S.C. 154(b) by 360 days.

(21) Appl. No.: 16/643,203

(22) PCT Filed: Aug. 14, 2018

(86) PCT No.: PCT/US2018/046712
§ 371 (c)(1),
(2) Date: Feb. 28, 2020

(87) PCT Pub. No.: WO2019/046012
PCT Pub. Date: Mar. 7, 2019

(65) Prior Publication Data
US 2020/0395644 A1 Dec. 17, 2020

Related U.S. Application Data

(60) Provisional application No. 62/551,842, filed on Aug. 30, 2017.

(51) Int. Cl.
*H01M 10/613* (2014.01)
*H01M 10/625* (2014.01)
(Continued)

(52) U.S. Cl.
CPC ..... *H01M 10/6557* (2015.04); *H01M 10/613* (2015.04); *H01M 10/625* (2015.04);
(Continued)

(58) Field of Classification Search
CPC ........... H01M 10/6554–6557; H01M 10/6567; H01M 10/6568; H01M 10/613; H01M 10/625; H01M 2220/20; Y02E 60/10
See application file for complete search history.

(56) References Cited

U.S. PATENT DOCUMENTS 4,231,524 A * 11/1980 Aprea ................... B05B 1/3426
239/468
5,249,623 A * 10/1993 Muller ...................... F23K 5/20
165/169
(Continued)

FOREIGN PATENT DOCUMENTS

CN 104051813 A 9/2014
DE 102012200400 A1 7/2013
(Continued)

OTHER PUBLICATIONS

International Search Report and Written Opinion for International Application No. PCT/US2018/046712 dated Oct. 18, 2018 (7 pages).
(Continued)

*Primary Examiner* — Stewart A Fraser
*Assistant Examiner* — Lilia Nedialkova
(74) *Attorney, Agent, or Firm* — Michael Best & Freidrich LLP

(57) ABSTRACT

A battery cooling system includes several battery cooling plates connected to a coolant manifold and coolant chiller. The coolant chiller is configured to remove heat from a flow of coolant that circulates through the battery cooling system. The coolant manifold has a first and a second chamber that both extend in a longitudinal direction and that are spaced apart and separated by an air gap. The first chamber receives a flow of chilled coolant from the coolant chiller, and the second chamber delivers to the coolant chiller a flow of coolant to be chilled. Plastic connectors in one-to-one correspondence with the battery cooling plates are mounted to
(Continued)

the coolant manifold to fluidly couple the first and second chambers of the coolant manifold to the battery cooling plates.

18 Claims, 4 Drawing Sheets

(51) Int. Cl.
 H01M 10/6555 (2014.01)
 H01M 10/6557 (2014.01)
 H01M 10/6568 (2014.01)
(52) U.S. Cl.
 CPC ... H01M 10/6555 (2015.04); H01M 10/6568 (2015.04); *H01M 2220/20* (2013.01)

(56) References Cited

U.S. PATENT DOCUMENTS

| | | | |
|---|---|---|---|
| 8,654,532 | B2 | 2/2014 | Chen et al. |
| 2006/0021745 | A1* | 2/2006 | Fritze ............... F28D 1/035 165/172 |
| 2009/0023056 | A1* | 1/2009 | Adams .............. H01M 10/6557 29/890.035 |
| 2010/0083694 | A1 | 4/2010 | Takagi et al. |
| 2012/0042977 | A1 | 2/2012 | Gadawski |
| 2012/0208053 | A1* | 8/2012 | Bender ............. H01M 10/6556 429/88 |
| 2013/0266838 | A1 | 10/2013 | Von Borck et al. |
| 2014/0202671 | A1 | 7/2014 | Yan |
| 2016/0356558 | A1 | 12/2016 | Franz et al. |
| 2018/0034119 | A1* | 2/2018 | Siering ............... H01M 10/613 |
| 2018/0051938 | A1* | 2/2018 | Espersen ............. F28D 1/05366 |
| 2019/0109355 | A1* | 4/2019 | Jones ................ H01M 10/6552 |
| 2019/0348652 | A1* | 11/2019 | Zhao ................... H01M 50/289 |
| 2020/0006826 | A1* | 1/2020 | Einoegg ............ H01M 10/6567 |

FOREIGN PATENT DOCUMENTS

| | | |
|---|---|---|
| WO | 9601973 A1 | 1/1996 |
| WO | 2013170927 A1 | 11/2013 |

OTHER PUBLICATIONS

Office Action issued from the Chinese Patent Office for related Application No. 201880055445.6 dated Aug. 8, 2022, (17 Pages including English Translation).
European Patent Office Communication pursuant to Article 94(3) EPC, dated Nov. 3, 2022, 7 pages.
Chinese Patent Office Second Office Action for related Application No. 201880055445.6 dated Jan. 5, 2023, (9 Pages including English Translation).

* cited by examiner

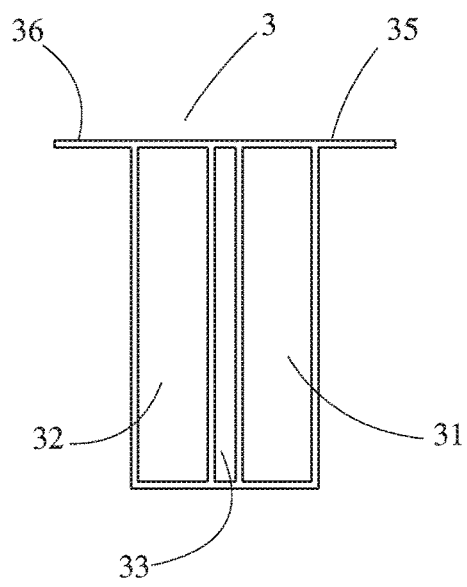
FIG. 3
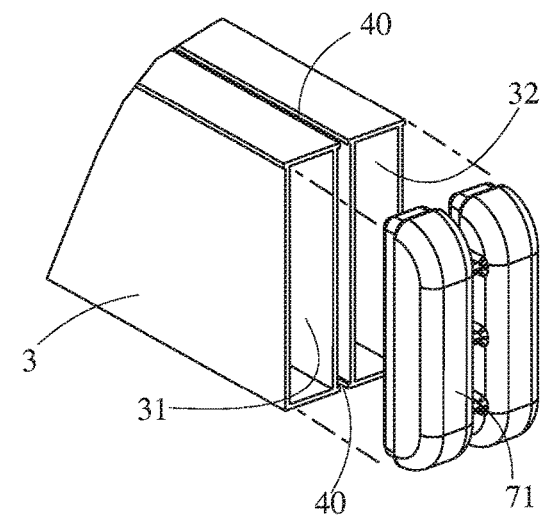
FIG. 5
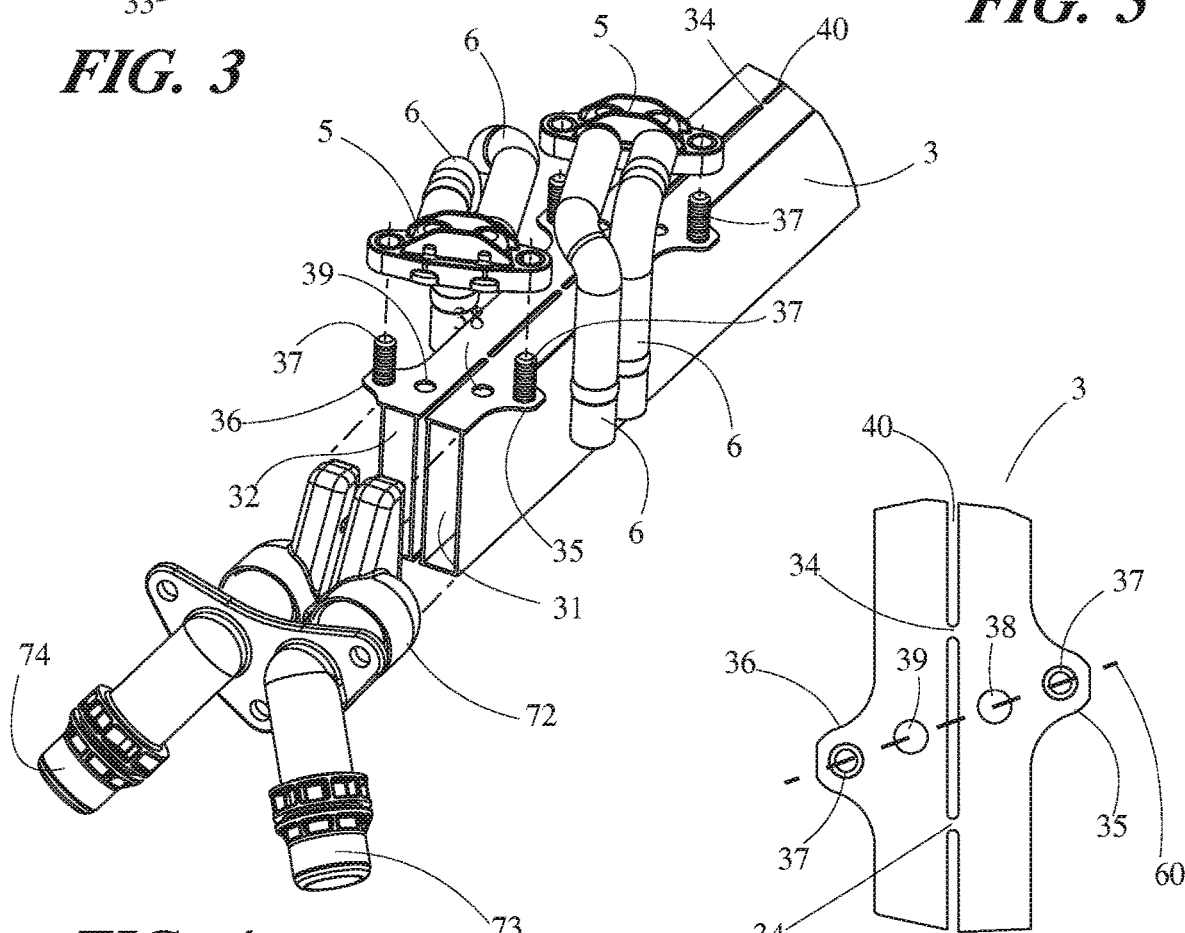
FIG. 4
FIG. 6

BATTERY COOLING SYSTEM

CROSS-REFERENCE TO RELATED PATENT APPLICATIONS

This application claims priority to U.S. Provisional Patent Application No. 62/551,842 filed on Aug. 30, 2017, the entire contents of which are hereby incorporated by reference herein.

BACKGROUND

Cooling plates for cooling heat-producing devices such as batteries are known. These plates maintain the operating temperature of the heat-producing devices within an acceptable operating range by efficiently removing the heat generated by the devices, thereby preventing degradation of the devices due to excessive temperatures. Typically, the heat is removed by transfer to a fluid stream that is routed through the plates. In such applications, it is often desirable to maintain a predominantly uniform temperature profile over the surface of the plate. Such a uniform temperature profile can be especially desirable in the cooling of batteries, particularly in applications such as electric or hybrid motor vehicle battery cooling.

Such a cooling plate can be assembled into a battery cooling system. A battery cooling system can include a heat exchanger (for example, a coolant chiller) that is configured to remove heat from a flow of liquid coolant that circulates through the cooling plate. The removal of heat within the heat exchanger can be accomplished by, for example, transferring the heat energy to a flow of refrigerant or other fluid that simultaneously circulates through the heat exchanger at a lower temperature than the liquid coolant.

In some particular applications, the use of a single large battery cooling plate has been found to be problematic due to, among other concerns, challenges in maintaining a suitably uniform flatness across the battery cooling plate and challenges in maintaining the aforementioned uniform temperature profile. Advantages have been found to result from subdividing the battery cooling system into multiple plates, each having a smaller surface area to which heat can be rejected from one or more batteries. Such a design of a battery cooling system does, however, create complexities in the routing of the coolant. In order to maximize life and performance of the batteries, it is especially desirable for the battery temperature to be regulated at as uniform a level as possible. As one particular consequence, this requires that the coolant be uniformly distributed, both in terms of temperature and in terms of flow rate, to the multiple individual battery cooling plates. All of the battery cooling plates should therefore be placed fluidly in parallel with one another. The resultant routing of multiple coolant lines between the coolant heat exchanger and the inlet and outlet ports of each of the battery cooling plates thereby becomes costly and labor-intensive, and occupies a large amount of space. Thus there is still room for improvement.

SUMMARY

According to some embodiments of the invention, a battery cooling system includes several battery cooling plates connected to a coolant manifold and coolant chiller. The coolant chiller is configured to remove heat from a flow of coolant that circulates through the battery cooling system. The coolant manifold has a first and a second chamber that both extend in a longitudinal direction and that are spaced apart and separated by an air gap. The first chamber receives a flow of chilled coolant from the coolant chiller, and the second chamber delivers to the coolant chiller a flow of coolant to be chilled. Plastic connectors in one-to-one correspondence with the battery cooling plates are mounted to the coolant manifold to fluidly couple the first and second chambers of the coolant manifold to the battery cooling plates.

Each of the battery cooling plates is provided with a coolant inlet, a coolant outlet, and a coolant flow path extending through the battery cooling plate between the coolant inlet and the coolant outlet. Each of the plastic connectors has a first fluid port that connects to the first chamber of the manifold, a second fluid port that connect to the second chamber of the manifold, a third fluid port in fluid communication with the first fluid port, and a fourth fluid port in fluid communication with the second fluid port. The third fluid port is fluidly coupled to the coolant inlet of the corresponding battery cooling plate, and the fourth fluid port is fluidly coupled to the coolant outlet of the corresponding battery cooling plate. In at least some embodiments, the fluid couplings between the battery cooling plates and the plastic connectors can be accomplished using hoses that transport the coolant between the components.

In some embodiments, the first and second chambers of the coolant manifold are connected to each other by a series of short, spaced apart webs that span across the air gap. In some especially preferable embodiments, the length dimension over which the coolant manifold extends in the longitudinal direction is a least ten times the cumulative extend of the series of webs in that longitudinal direction. This minimizes the undesirable conduction of heat between the warmer coolant in the second chamber and the colder coolant in the first chamber.

In some embodiments, the coolant manifold includes a first flange that extends from a planar surface of the first chamber, and a second flange that extends from a planar surface of the second chamber. In some especially preferred embodiments, the first and second planar surfaces are coplanar with each other. Threaded studs extend from the first and second flanges, and each one of the plastic connectors is mounted to the coolant manifold by at least one of the studs extending from the first flange and by at least one of the studs extending from the second flange. In some such embodiments, portions of the first and second flanges have been removed in locations between adjacent ones of the plastic connectors.

In some especially preferable embodiments, the planar surfaces of the coolant manifold from which the first and second flanges extend are formed as one continuous planar surface from which material is removed in a region corresponding to the air gap of the coolant manifold in order to separate the planar surfaces, leaving them connected to one another only by short webs.

According to some embodiments, the coolant manifold is provided with a series of first holes that extend through a wall of the first chamber, and a series of second holes that extend through a wall of the second chamber. Each one of the first holes is co-located with the first fluid port of one of the plastic connectors, and each one of the second holes is similarly co-located with the second fluid port of one of the plastic connectors. The wall of the first chamber can be coplanar with the wall of the second chamber, and can be separated by gaps between the short webs.

In some embodiments the coolant manifold is provided with mounting locations for the plastic connectors. The mounting locations are provided in pairs, and each pair can be arranged in a straight line with a single one of the first holes and a single one of the second holes. In some such embodiments the straight lines are all parallel to one another, and are at an oblique angle to the longitudinal direction.

It may be preferable, in some embodiments, for at least some of the battery cooling plates to be arranged on one side of the coolant manifold and for at least some of the battery cooling plates to be arranged on an opposite side. The one side can be the side corresponding to the first coolant chamber, and the opposite side can be the side corresponding to the second coolant chamber. In some particularly preferable embodiments, the plastic connectors are arranged sequentially along the longitudinal direction of the coolant manifold, and those plastic connectors that are fluidly coupled to the battery cooling plates on the one side of the coolant manifold are alternatingly arranged with those plastic connectors that are fluidly coupled to the battery cooling plates on the opposing side of the coolant manifold. In some such embodiments each one of the plastic connectors can be mounted to the coolant manifold with an orientation that is a 180° rotation from the orientation of an adjacent one of the connectors.

According to another embodiment of the invention, a method of making a battery cooling system uses an aluminum extrusion. The aluminum extrusion is cut to a length, and a first series of holes are formed into a wall of the extrusion. A second series of holes are also formed into a wall of the extrusion, which may be connected to the wall of the extrusion into which the first series of holes are formed. Material is removed from the aluminum extrusion in order to thermally decouple the walls containing the first and second series of holes from each other over a majority of the length of the extrusion. Plastic connectors are joined to the aluminum extrusion, with each one having a first fluid port engaging one of the first series of holes and a second fluid port engaging one of the second series of holes. A battery plate is fluidly coupled to each one of the plastic connectors.

In some embodiments, the forming of the first and second series of holes and the removal of material is accomplished by laser cutting.

In at least some embodiments, a hose is extended between one of the plastic connectors and an inlet port of the corresponding battery cooling plate to create a flow path between the inlet port and that one of the first series of holes. Another hose is extended between that plastic connector and an outlet port of that battery cooling plate to create a flow path between the outlet port and one of the second series of holes.

In some embodiments, a third and a fourth series of holes are formed into the aluminum extrusion. The third series of holes is formed through a flange of the aluminum extrusion extending from the wall into which the first series of holes are formed. The fourth series of holes is formed through a flange of the aluminum extrusion extending from the wall into which the second series of holes are formed. A threaded stud is secured into each of the third and fourth series of holes, and the plastic connectors are mounted to the aluminum extrusion using the threaded studs.

BRIEF DESCRIPTION OF THE DRAWINGS

FIG. 3 is a section view of the coolant manifold of FIG. 2.

FIG. 4 is an exploded perspective view showing a portion of the battery cooling system of FIG. 1.

FIG. 5 is another exploded perspective view showing a portion of the battery cooling system of FIG. 1.

FIG. 6 is a plan view of a portion of the coolant manifold of FIG. 2.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
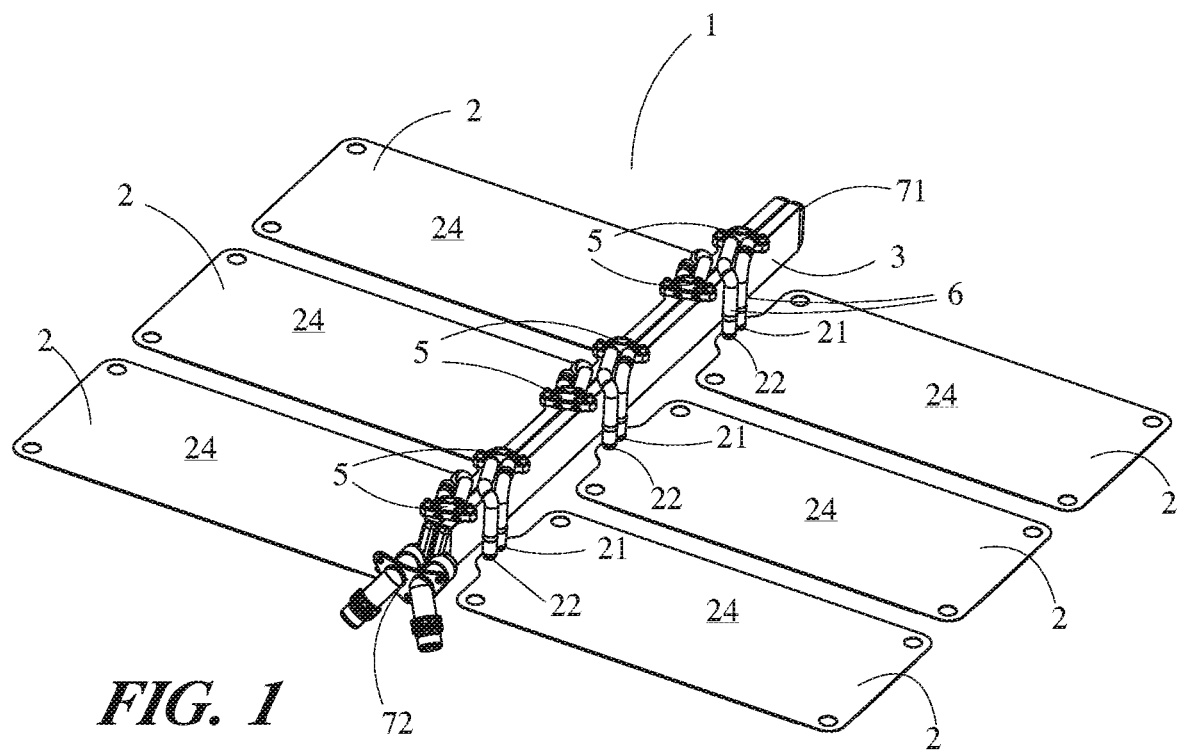
FIG. 1 is a perspective view of a portion of battery cooling system according to an embodiment of the invention.
Figure 2:
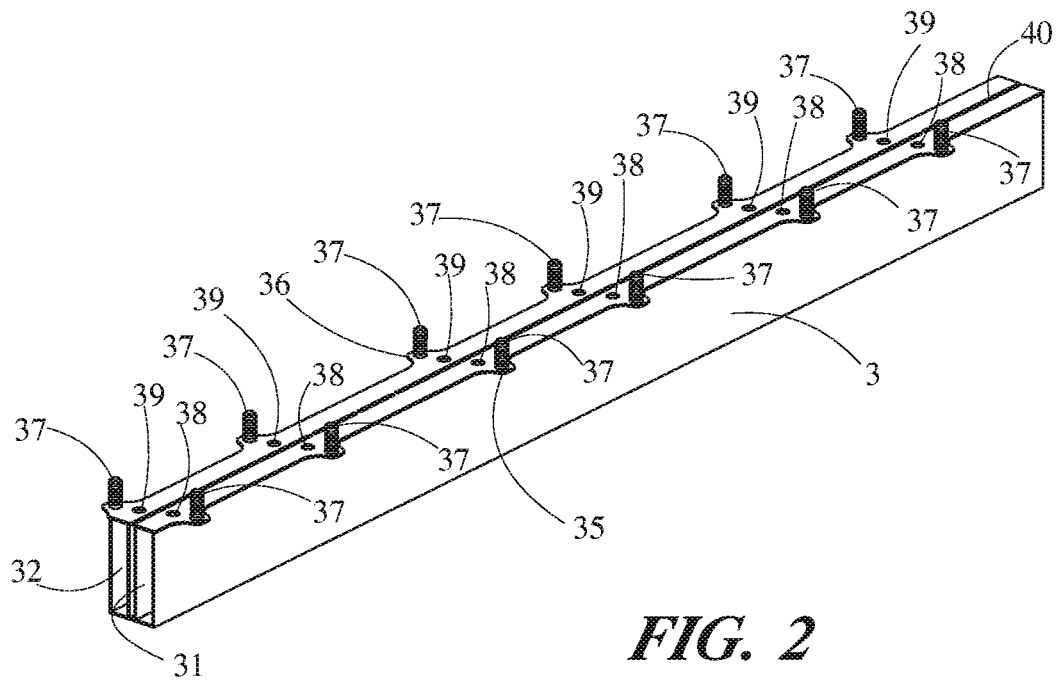
FIG. 2 is a perspective view of a coolant manifold of the battery cooling system of FIG. 1, with some parts removed.
Figure 7:
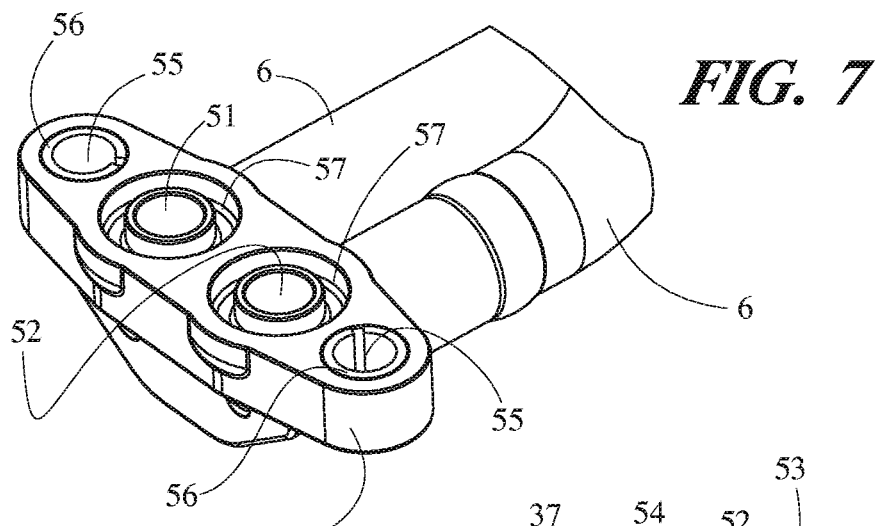
FIG. 7 is a partial perspective view of select portions of the battery cooling system of FIG. 1.
Figure 9:
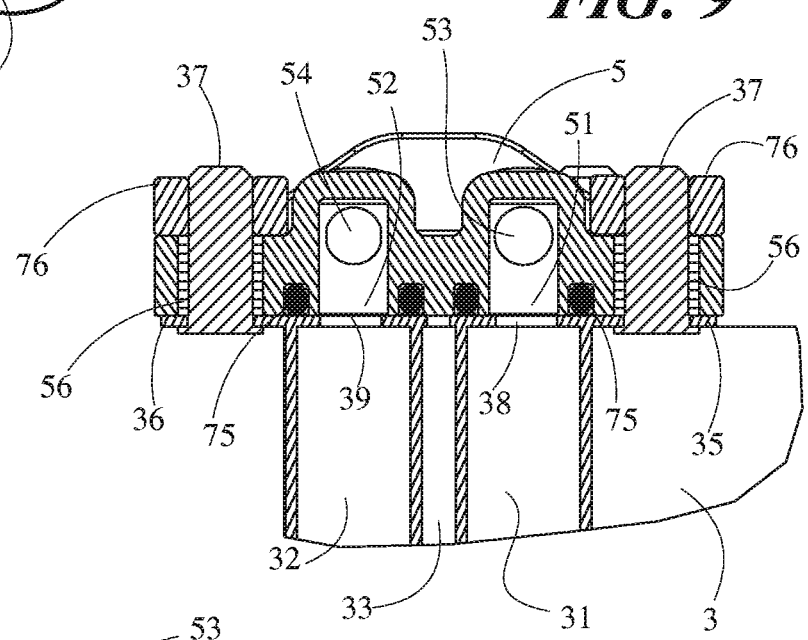
FIG. 9 is a sectional elevation view of a portion of the battery cooling system of FIG. 1.
Figure 8:
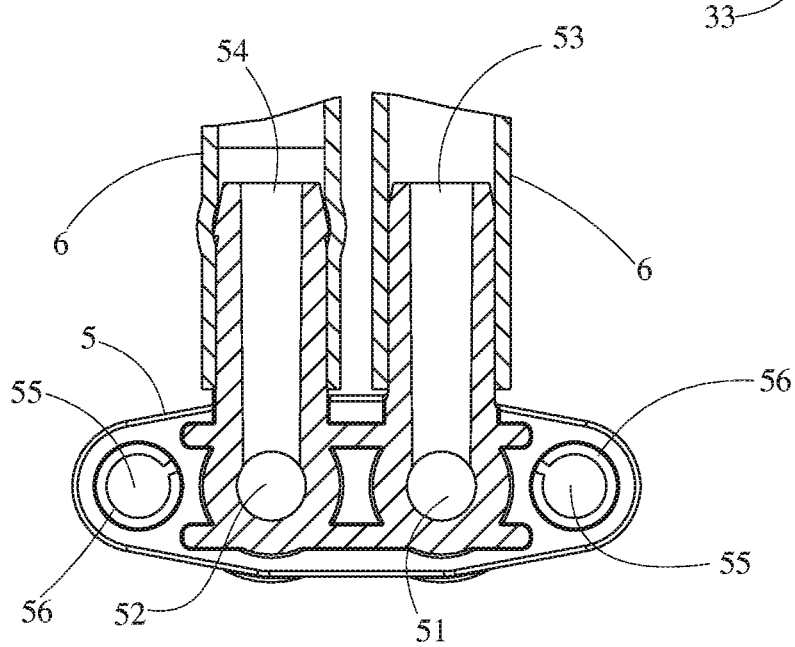
FIG. 8 is a sectional plan view of a portion of the battery cooling system of FIG. 1.

A portion of a battery cooling system 1 is depicted in FIG. 1, and includes multiple battery cooling plates 24 to which electrical batteries (not shown) can be mounted, particularly for a vehicular system such as an electric or hybrid (e.g. electric and combustion engine) automobile. A liquid coolant (such as for example water, ethylene glycol, a mixture of water and ethylene glycol, or other similar liquid coolants) is circulated through the battery cooling plates 24 in order to remove heat from the electrical batteries. This removal of heat is desirable in order to regulate the temperature of the electrical batteries to be within an acceptable and/or desirable temperature range during periods of charging and discharging of the electrical batteries, thereby maximizing both the performance and the operational life of the electrical batteries.

The coolant circulating through the battery cooling plates 24 is supplied through a coolant manifold 3, which is part of the battery cooling system 1. The coolant manifold 3 extends in a longitudinal direction, with half of the battery cooling plates 24 disposed to either side of the coolant manifold 3, thereby efficiently routing the liquid coolant from the coolant manifold 3 to each of the battery cooling plates 24 and back to the coolant manifold 3. Each of the battery cooling plates 24 is thereby placed hydraulically in parallel to the other battery cooling plates 24 between an inlet chamber 3 and an outlet chamber 32 of the coolant manifold 3.

Portions of the coolant manifold 3 are depicted in more detail in FIGS. 2-9. The coolant manifold 3 is preferably constructed using an aluminum extrusion to provide two coolant chambers, one of which (the first coolant chamber) is the inlet chamber 31 and the other of which (the second coolant chamber) is the outlet chamber 32. In the exemplary embodiment, the coolant chambers 31 and 32 are constructed to have a rectangular cross-section, but it should be understood that other shapes might be equally or even more suitable in some applications. The extrusion further provides an air gap 33 between the coolant chambers 31 and 32, as best seen in FIG. 3. The air gap 33 prevents the undesirable conduction of heat between the warmer coolant flowing within the outlet chamber 32 and the colder coolant flowing within the inlet chamber 31.

An end cap 72 is affixed to an end of the coolant manifold 3 in order to cap off that end of the coolant manifold. The end cap 72 of the exemplary embodiment can be constructed as an injection-molded plastic part or as a cast aluminum part. Alternatively, the end cap 72 can be constructed as an assembly of parts that are joined together. Similarly, another end cap 71 is provided at the opposing longitudinal end of the coolant manifold 3 for the same purpose. The end caps 71 and 72 can be affixed to the coolant manifold in order to provide a leak-free joint, for example by gluing, brazing, soldering welding, or mechanical assembly.

Figure 11:
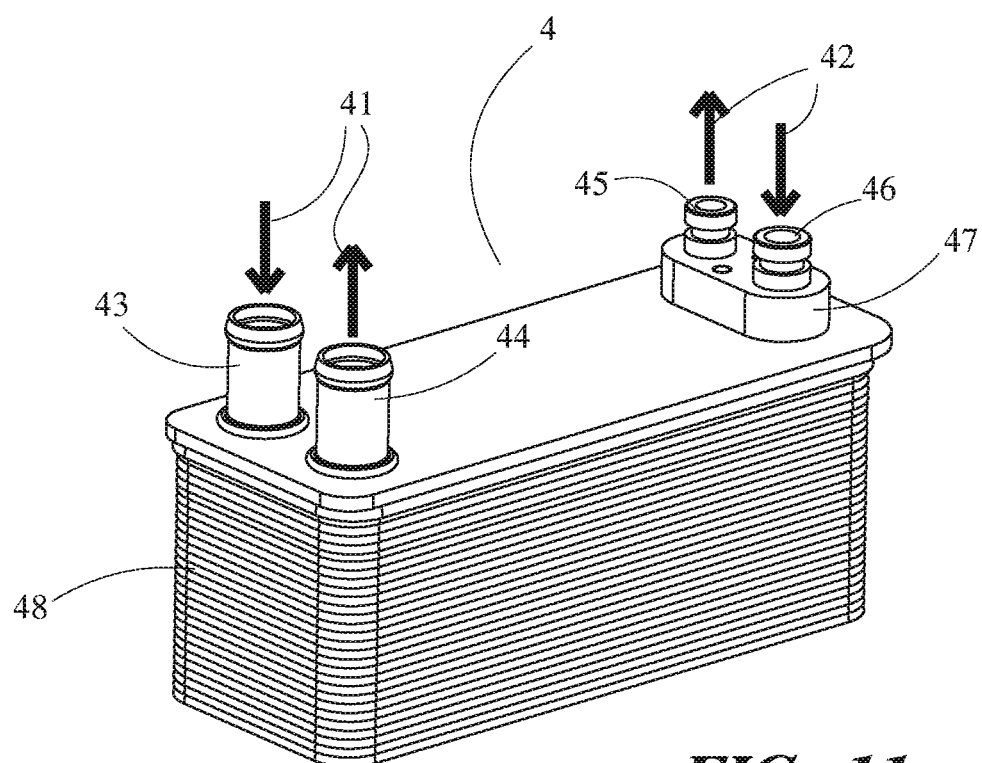
FIG. 11 is a perspective view of a coolant chiller for use in the battery cooling system of FIG. 1.

A coolant inlet port 73 and a coolant outlet port 74 are provided as part of the end cap 72. A coolant chiller 4 is also provided as part of the battery cooling system 1, and is fluidly coupled to the coolant manifold 3 by way of the inlet port 73 and the outlet port 74. An exemplary coolant chiller 4 is depicted in FIG. 11, and will be described in more detail further on herein. The coolant chiller can be located remotely from the coolant manifold 3 and the battery cooling plates 24, and can be fluidly coupled to the coolant manifold 3 by way of piping, hoses, or other fluid carrying conduits (not shown) that connect to the ports 73, 74. While both the inlet port 73 and the outlet port 74 of the exemplary embodiment are provided as part of the same end cap, in some alternative embodiments each of the end caps 71 and 72 are provided with one of the ports 73, 74.

Plastic connectors 5 are mounted to a top surface of the extrusion as part of the coolant manifold 3. Each of the plastic connectors 5 corresponds to one of the battery cooling plates 24, and provides fluid connections between the coolant chambers 31 and 32 and that corresponding battery cooling plate 24. Each plastic connector 5 is provided with a first fluid port 51 that is fluidly connected to the inlet coolant chamber 31 by way of an aperture 38 extending through a wall of the inlet coolant chamber 31, with that wall arranged at the top surface of the extrusion. Similarly, each plastic connector 5 is also provided with a second fluid port 52 that is fluidly connected to the outlet coolant chamber 32 by way of an aperture 39 that extends through a wall of the outlet coolant chamber 32, with that wall also arranged at the top surface of the extrusion.

Each plastic connector is also provided with a third fluid port 53 that fluidly communicates through the plastic connector 5 with the first fluid port 51, and is further provided with a fourth fluid port 54 that fluidly communicates through the plastic connector 5 with the second fluid port 52. As can be seen in the cross-sectional views of FIG. 8 and FIG. 9, the respective pairs of ports fluidly communicate through the plastic connector by flow channels that extend through the plastic connector 5.

The plastic connectors 5 are mounted to the coolant manifold 3 by threaded studs 37 that are secured in pairs along the longitudinal direction of the coolant manifold 3, with each pair of the threaded studs 37 corresponding to one of the plastic connectors 5. To allow for the connection of the threaded studs 37, the coolant manifold 3 is provided with a first flange 35 and with a second flange 36. Each of the pairs of studs 37 includes a first stud that is secured to the flange 35 and a second stud that is secured to the flange 36. The flange 35 extends from a planar bounding wall of the coolant chamber 31, and specifically from the wall that includes the apertures 38. The flange 36 extends from a planar bounding wall of the coolant chamber 32, and specifically from the wall that includes the apertures 39. In some especially preferable embodiments, one of the apertures 38 and one of the apertures 39 lies on a straight line (as indicated by the dashed line 60 in FIG. 6) that extends between a given one of the pairs of studs 37, with that line 60 being arranged at an oblique angle to the longitudinal direction of the coolant manifold 3.

Each plastic connector 5 is provided with a pair of mounting holes 55. The plastic connector is mounted to the extrusion of the coolant manifold 3 by placing the plastic connector 5 so that one of the pairs of threaded studs 37 extends through the mounting holes 55 of the plastic connector 5. The plastic connector 5 is provided with an annular groove 57 surrounding the ports 51 and 52, and a seal 75 (for example, an O-ring) is received into each of the annular grooves 57. Threaded nuts 76 are engaged onto the exposed ends of the threaded studs 37 after placement of the plastic connector 5, and are tightened to compress the seals 75 in order to secure the plastic connector 5 to the extrusion, thereby creating a fluid-tight seal around each of the fluid ports 51, 52.

In the exemplary embodiment, split metal bushings 56 are inserted into the mounting holes 55 of the plastic connector 5. The split metal bushings 56 can serve as a hard stop for the nuts 76, so that distortion of the plastic connector 5 by over-tightening of the nuts 76 is avoided.

It should be understood that the threaded studs 37 are shown as only one example of mounting hardware that can be provided as part of the coolant manifold 3 for the purpose of securing the plastic connectors 5. Other alternative type of hardware that accomplish the same purpose of securing the plastic connectors 5 to the coolant manifold 3 in a leak-tight manner can alternatively be employed. By way of example, a press-in insert with internal threads can be secured to the opposing side of the flanges 35 and 36, and an externally threaded component can be inserted through the mounting holes 55 to engage the insert and securely mount the plastic connector 5.

Figure 10:
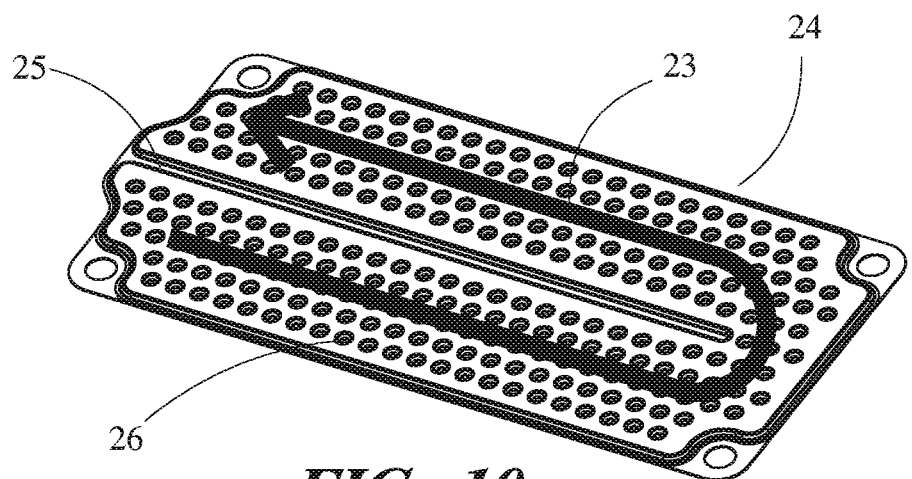
FIG. 10 is a perspective view of a battery cooling plate of the battery cooling system of FIG. 1.

Each of the battery cooling plates 24 is provided with a coolant inlet 21 and a coolant outlet 22. Hoses 6 are provided as part of the battery cooling system 1 to provide fluid conduits between the coolant port 53 of a plastic connector 5 and the coolant inlet 21 of the corresponding battery plate 24, and between the coolant port 54 of that plastic connector 5 and the coolant outlet 22 of the battery cooling plate 24. As shown in FIG. 10, a U-shaped coolant flow path 23 extends through the battery cooling plate 24 between the coolant inlet 21 and the coolant outlet 22. The battery cooling plate can be provided with a linear bead 25 to define the coolant flow path 23, and dimples 26 or other flow turbulating structures can be arranged along the coolant flow path 23.

As shown in FIG. 1, the plastic connectors 5 can be arranged along the longitudinal direction of the coolant manifold 3 so that each one has an orientation that is a 180° rotation from the orientation of the adjacent plastic connector 5. When the lines 60 are arranged at an oblique angle, this results in adjacent ones of the plastic connectors 5 directing coolant to and from battery plates 24 arranged on opposing sides of the coolant manifold 3. In such a battery cooling system 1, some of the battery cooling plates 24 are arranged on the side of the coolant manifold 3 that is closest to the inlet coolant chamber 31, while others of the battery cooling plates 24 are arranged on the opposing side of the coolant manifold, e.g. the side of the coolant manifold 3 that is closest to the outlet coolant chamber 32. The plastic connectors 5 that are fluidly coupled to the battery cooling plates on the side closest to the coolant inlet chamber 31 are alternatingly arranged from the plastic connectors 5 that are fluidly coupled to the battery cooling plates on the side closest to the coolant outlet chamber 32.

It is especially preferable for the cross-sectional area of the structural connections between the coolant inlet chamber 31 and the coolant outlet chamber 32 of the coolant manifold 3 to be minimized so that the undesirable transfer of heat between the warmer coolant in the outlet chamber 32 and the colder coolant in the inlet chamber 31 is also minimized or eliminated. To that end, the coolant inlet chamber 31 and the coolant outlet chamber 32 are joined to each other by short webs 34 of the aluminum extrusion material. The short webs 34 can be arranged, for example, at the top and/or the bottom surfaces of the extrusion along the length of the coolant manifold 3. In some especially preferable embodiments, the length of the coolant manifold in the longitudinal direction is at least ten times the cumulative extent of the webs 34 in that direction. The webs 34 can be evenly spaced along the longitudinal direction, or the spacing can be adjusted to correspond at least somewhat with the locations of the plastic connectors 5.

In one especially advantageous method of making the battery cooling system 1, the coolant manifold 3 is produced at least in part by performing a series of operations on an aluminum extrusion. These operations include cutting the extrusion to a length, forming a first set of holes 38 through a first wall of the extrusion, forming a second set of holes 39 through a second wall of the extrusion, and removing material from the extrusion to thermally decouple the first and second walls of the extrusion over a majority of the length of the extrusion. These steps need not occur in the order presented. By way of example, in some embodiments it may be preferable to cut the extrusion to length after some or all of the other operations are complete. It may also or alternatively be desirable to alternate between forming holes of the first set and holes of the second set, and/or between forming the holes and removing material to thermally decouple the walls.

The method of making the battery cooling system 1 further includes mounting plastic connectors 5 to the aluminum extrusion, and fluidly coupling a battery cooling plate 24 to each one of the plastic connectors 5. Each of the plastic connectors 5 is mounted so that a first fluid port 51 of the plastic connector 5 engages one of the first set of holes 38 and so that a second fluid port 52 of the plastic connector 5 engages one of the second set of holes 39. By "engaging" is meant that a fluid connection is established to allow for the flow of coolant between the plastic connector 5 and the coolant chambers 31, 32. By also fluidly coupling the plastic connector 5 to the battery cooling plate 24, coolant flow paths extending from the coolant inlet chamber 31 to the coolant outlet chamber 32 and passing through the battery cooling plates 24 are established.

The step of fluidly coupling a battery cooling plate 24 to a plastic connector 5 can include extending a first hose 6 between the plastic connector 5 and a coolant inlet 21 of the battery cooling plate 24, and extending a second hose 6 between the plastic connector 5 and a coolant outlet 22 of the battery cooling plate 24. The first hose 6 creates a flow path between the coolant inlet 21 of the battery cooling plate 24 and one of the holes 38, and the second hose 6 creates another flow path between the coolant outlet 22 of the battery cooling plate 24 and one of the holes 39.

In some especially preferred embodiments, the hoses 6 are flexible members that allow for the fluid connection between the coolant manifold 3 and the battery cooling plates 24 to be easily made after at least a portion of the battery cooling system 1 has been installed into the chassis of a vehicle. For example, the battery cooling plates 24 can first be installed into a sub-floor portion of a vehicle chassis, and the cooling manifold 3 can be subsequently installed. By having the hoses 6 be of a flexible nature, the routing of the fluid conduits through the partially completed chassis can be made significantly easier. The hoses 6 can, in such an embodiment, be connected to the plastic connectors 5 and/or to the coolant inlets and outlets 21, 22 using hose clamps or the like. In alternative embodiments, the hoses 6 can be more rigid fluid conduits and/or can be attached using other known coupling mechanisms.

The method of making the battery cooling system 1 can additionally include forming additional holes through flanges of the aluminum extrusion in order to provide mechanical mounting features for the plastic connectors 5. Specifically a third set of holes can be formed into a flange 35 that extends from the aforementioned first wall of the extrusion, and a fourth set of holes can be formed into a flange 36 that extends from the aforementioned second wall of the extrusion. Threaded studs 37 can then be secured into those third and fourth sets of holes, and can engage with mounting holes 55 of the plastic connectors 5 in order to securely mount the plastic connectors 5 to the extrusion. The flanges 35 and 36 extend beyond the coolant chambers provided within the coolant manifold 3 so that the forming of the third and fourth sets of holes does not cause any potential fluid leakage form the coolant manifold 3. The forming of the third and fourth sets of holes can be done concurrently with the forming of the first and second sets of holes and/or with the removal of material to thermally decouple the coolant chambers.

In some especially preferable embodiments, the forming of all of the holes (e.g. the first and second sets of holes and, if present, the third and fourth sets of holes) and the removal of material for thermal decoupling can all be accomplished within a single machining operation. Such a machining operation can be performed within a computer numerical control (CNC) machining center, for example. In some specially preferable embodiments, a laser tube machining center is used, so that the formatting of the holes and the removal of material is accomplished by laser cutting. Such a machining center can additionally perform the step of cutting the extrusion to length, by receiving the extrusion in long standardized lengths.

As an additional, but optional, step in the processing of the aluminum extrusion, portions of the flanges 35, 36 can be removed in areas away from the third and fourth sets of holes. This removal of the flange material can allow for easier routing of the fluid hoses 6, by providing space for the hose 6 to extend immediately adjacent to the chambers 31, 32. Additionally, this removal of material can result in decreased weight of the battery cooling system 1. Removal of the flange material can be accomplished within the same machining center as the other previously described operations on the aluminum extrusion.

An exemplary coolant chiller 4 that can be provided as part of the battery cooling system 1 is depicted in FIG. 11.

The coolant chiller 4 transfers thermal energy from the liquid coolant circulating through the battery cooling plates 24 to another fluid (for example, a refrigerant) that circulates through the chiller 4 at a lower temperature. The coolant chiller 4 is constructed as a brazed stack of nested plates 48. The liquid coolant 41 is received from the coolant outlet chamber 32 of the coolant manifold 3 into the coolant chiller 4 through a coolant inlet port 43, and the flow of refrigerant 42 is received into the coolant chiller 4 through a refrigerant inlet port 46. Flow channels for the coolant 41 and the refrigerant 42 are alternatingly arranged between adjacent ones of the plates 48, so that the coolant 41 and the refrigerant 42 are placed into efficient heat transfer relation with each other in order to transfer heat from the coolant 41 through the plates 48 to the refrigerant 42. The coolant 41 is subsequently removed from the coolant chiller 4 by way of a coolant outlet port 44, and is returned to the coolant inlet chamber 31 of the coolant manifold 3. The refrigerant is removed from the coolant chiller 4 by way of a refrigerant outlet port 45.

The coolant chiller 4 can be connected into a vapor compression refrigerant circuit by the inlet and outlet ports 45, 46 so that heat received by the refrigerant within the coolant chiller 4 can be rejected to the ambient. The refrigerant ports 45, 46 can be integrated into a refrigerant fitting block 47 for ease of connection into the refrigerant system. Hoses, piping, or other such fluid lines can extend between the coolant outlet port 44 of the coolant chiller 4 and the coolant inlet port 73 of the coolant manifold 3 and between the coolant inlet port 43 of the coolant chiller 4 and the coolant outlet port 74 of the coolant manifold 3.

A coolant pump or other similar device capable of circulating the coolant through the battery cooling system 1 can be included in the battery cooling system 1. Such a coolant pump (not shown) can be located, for example, along the connection between the coolant outlet port 74 of the coolant manifold 3 and the coolant inlet port 43 of the coolant chiller 4, so that the coolant outlet chamber 32 is arranged on the suction side of the coolant pump and the coolant flow channels within the coolant chiller 4 are arranged on the discharge side of the coolant pump. Alternatively, the coolant pump can be located along the connection between the coolant outlet port 44 of the coolant chiller 4 and the coolant inlet port 73 of the coolant manifold 3, so that the coolant flow channels within the coolant chiller 4 are arranged on the suction side of the coolant pump and the coolant inlet chamber 31 of the coolant manifold 3 is arranged on the discharge side of the coolant pump.

It should be understood that the coolant chiller 4 can be constructed in other ways, and can use a fluid other than refrigerant to remove the heat from the flow of coolant. By way of example, the coolant chiller can be configured as a coolant to air radiator in order to directly transfer the heat from the coolant to a flow of ambient air at a lower temperature than the liquid coolant.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A battery cooling system comprising:
   a plurality of battery cooling plates, each having a coolant inlet, a coolant outlet, and a coolant flow path extending through the battery cooling plate between the coolant inlet and the coolant outlet;
   a coolant chiller configured to remove heat from a flow of coolant;
   a coolant manifold including:
   a first coolant chamber extending in a longitudinal direction and fluidly coupled to the coolant chiller to receive a flow of coolant therefrom;
   a second coolant chamber extending in the longitudinal direction and fluidly coupled to the coolant chiller to deliver a flow of coolant thereto, the second coolant chamber and the first coolant chamber being spaced apart and separated by an air gap, the air gap formed between the first and second coolant chambers;
   a series of webs arranged along the longitudinal direction to join the first and second coolant chambers, wherein the first coolant chamber, the second coolant chamber, and the series of webs are provided as a monolithic aluminum structure, and wherein the air gap is formed in between two of the series of webs, the series of webs structurally holding the first coolant chamber to the second coolant chamber; and
   a plurality of plastic connectors in one-to-one correspondence with the plurality of battery cooling plates, each mounted to the coolant manifold and each including a first fluid port connected to the first coolant chamber, a second fluid port connected to the second coolant chamber, a third fluid port in fluid communication with the first fluid port through the plastic connector, and a fourth fluid port in fluid communication with the second fluid port through the plastic connector, the third fluid port being fluidly coupled to the coolant inlet of the corresponding battery cooling plate and the fourth fluid port being fluidly coupled to the coolant outlet of the corresponding battery cooling plate,
   wherein at least one of the plurality of plastic connectors is mounted to the coolant manifold and extends from the first coolant chamber to the second coolant chamber and across the air gap, and
   wherein the third and fourth fluid ports of the plurality of plastic connectors are fluidly coupled to the plurality of battery cooling plates by way of hoses.

2. The battery cooling system of claim 1, wherein the coolant manifold extends over a length dimension in the longitudinal direction and wherein said length dimension is at least ten times the cumulative extent of the series of webs in the longitudinal direction.

3. The battery cooling system of claim 1, wherein the coolant manifold includes a first flange extending from a planar surface of the first coolant chamber, a second flange extending from a planar surface of the second coolant chamber that is coplanar with the planar surface of the first coolant chamber, and a plurality of threaded studs extending from the first and second flanges, each one of the plurality of plastic connectors being mounted to the coolant manifold by way of at least one of the plurality of threaded studs extending from the first flange and at least one of the plurality of threaded studs extending from the second flange.

4. The battery cooling system of claim 3, wherein portions of the first and second flanges have been removed in locations between adjacent ones of the plurality of plastic connectors.

5. The battery cooling system of claim 1, wherein the coolant manifold includes a first plurality of holes extending through a wall of the first chamber and a second plurality of holes extending through a wall of the second chamber, each one of the first plurality of holes being co-located with the first fluid port of one of the plurality of plastic connectors and each one of the second plurality of holes being co-located with the second fluid port of one of the plurality of plastic connectors.

6. The battery cooling system of claim 5, wherein the coolant manifold includes a plurality of mounting locations for the plastic connectors, the mounting locations being arranged in pairs, each pair being in a straight line with a single one of the first plurality of holes and with a single one of the second plurality of holes.

7. The battery cooling system of claim 6, wherein said straight lines are at an oblique angle to the longitudinal direction of the coolant manifold.

8. The battery cooling system of claim 5, wherein one or more seals are provided in one or more recesses of each one of the plurality of plastic connectors, the one or more seals providing a fluid seal between the first fluid port of the plastic connector and the corresponding hole of the first plurality of holes, and between the second fluid port of the plastic connector and the corresponding hole of the second plurality of holes.

9. The battery cooling system of claim 1, wherein at least some of the plurality of battery cooling plates are arranged on a first side of the coolant manifold corresponding to the first coolant chamber and wherein at least some of the plurality of battery cooling plates are arranged on a second side of the coolant manifold corresponding to the second coolant chamber.

10. The battery cooling system of claim 9, wherein the plurality of plastic connectors are arranged sequentially along the longitudinal direction and wherein those ones of the plurality of plastic connectors that are fluidly coupled to the battery cooling plates arranged on the first side of the coolant manifold are alternatingly arranged with those ones of the plurality of plastic connectors that are fluidly coupled to the battery cooling plates arranged on the second side of the coolant manifold.

11. The battery cooling system of claim 10, wherein each one of the plurality of plastic connectors has an orientation that is a 180° rotation from the orientation of an adjacent one of the plurality of plastic connectors.

12. The battery cooling system of claim 1, wherein the at least one of the plurality of plastic connectors is directly mounted to the coolant manifold.

13. The battery cooling system of claim 1, wherein the coolant manifold includes a threaded stud, and wherein the at least one of the plurality of plastic connectors is mounted to the coolant manifold by the threaded stud, wherein the threaded stud is spaced apart from the first fluid port and the second fluid port.

14. The battery cooling system of claim 13, wherein the threaded stud is positioned on a flange extending away from the coolant manifold.

15. The battery cooling system of claim 14, wherein the threaded stud is a first threaded stud,
wherein the coolant manifold includes a second threaded stud,
wherein the at least one of the plurality of plastic connectors is mounted to the coolant manifold by the second threaded stud, and
wherein the second threaded stud is spaced apart from the first threaded stud such that the first fluid port of the at least one of the plurality of plastic connectors and the second fluid port of the at least one of the plurality of plastic connectors are located between the first and second threaded studs.

16. A battery cooling system comprising:
a plurality of battery cooling plates, each having a coolant inlet, a coolant outlet, and a coolant flow path extending through the battery cooling plate between the coolant inlet and the coolant outlet;
a coolant chiller configured to remove heat from a flow of coolant;
a coolant manifold including:
a first coolant chamber extending in a longitudinal direction and fluidly coupled to the coolant chiller to receive a flow of coolant therefrom;
a second coolant chamber extending in the longitudinal direction and fluidly coupled to the coolant chiller to deliver a flow of coolant thereto, the second coolant chamber and the first coolant chamber being spaced apart and separated by an air gap, the air gap formed between the first and second coolant chambers;
a series of webs arranged along the longitudinal direction to join the first and second coolant chambers, wherein the first coolant chamber, the second coolant chamber, and the series of webs are provided as a monolithic aluminum structure, and wherein the air gap is formed in between two of the series of webs, the series of webs structurally holding the first coolant chamber to the second coolant chamber; and
a plurality of plastic connectors in one-to-one correspondence with the plurality of battery cooling plates, each mounted to the coolant manifold and each including a first fluid port connected to the first coolant chamber, a second fluid port connected to the second coolant chamber, a third fluid port in fluid communication with the first fluid port through the plastic connector, and a fourth fluid port in fluid communication with the second fluid port through the plastic connector, the third fluid port being fluidly coupled to the coolant inlet of the corresponding battery cooling plate and the fourth fluid port being fluidly coupled to the coolant outlet of the corresponding battery cooling plate,
wherein at least one of the plurality of plastic connectors is mounted to the coolant manifold and extends from the first coolant chamber to the second coolant chamber and across the air gap, and
wherein each third fluid port is fluidly coupled to the coolant inlet of the corresponding battery cooling plate via a first coolant hose, and wherein each fourth fluid port is fluidly coupled to the coolant outlet of the corresponding battery cooling plate via a second coolant hose.

17. The battery cooling system of claim 16, wherein the coolant is configured to flow from the first coolant chamber, then through the first fluid port, then through the at least one of the plurality of plastic connectors, then through the first coolant hose, then through the third fluid port, and then into the coolant inlet of the corresponding battery cooling plate, and
wherein the coolant is configured to flow from the coolant outlet of the corresponding battery cooling plate, then through the fourth fluid port, then through the second coolant hose, then through the at least one of the plurality of plastic connectors, then through the second fluid port, and then into the second coolant chamber.

18. The battery cooling system of claim 16, wherein the first and second coolant hoses are flexible and fluidly connect the coolant manifold and the corresponding battery cooling plate.

* * * * *